US008924796B2

(12) United States Patent
Eder et al.

(10) Patent No.: US 8,924,796 B2
(45) Date of Patent: Dec. 30, 2014

(54) SYSTEM AND METHOD FOR PROCESSING TRACE INFORMATION

(75) Inventors: Patrik Eder, Taufkirchen (DE); Markus Lyra, Munich (DE)

(73) Assignee: Intel Mobile Communications GmbH, Neubiberg (DE)

(*) Notice: Subject to any disclaimer, the term of this patent is extended or adjusted under 35 U.S.C. 154(b) by 254 days.

(21) Appl. No.: 13/426,900

(22) Filed: Mar. 22, 2012

(65) Prior Publication Data
US 2013/0254596 A1 Sep. 26, 2013

(51) Int. Cl.
*G06F 11/00* (2006.01)
(52) U.S. Cl.
USPC .......................................................... 714/45
(58) Field of Classification Search
CPC ... G06F 11/25; G06F 11/263; G06F 11/3466; G06F 11/3476; G06F 11/348; G06F 11/3495; G06F 11/364; G06F 11/3636; G06F 11/3648; G06F 11/3656; G06F 13/38; G06F 2201/86
USPC .......................................... 714/45; 712/227
See application file for complete search history.

(56) References Cited

U.S. PATENT DOCUMENTS

| | | | | |
|---|---|---|---|---|
| 6,530,047 | B1 * | 3/2003 | Edwards et al. | 714/724 |
| 7,020,768 | B2 * | 3/2006 | Swaine et al. | 712/228 |
| 7,069,176 | B2 * | 6/2006 | Swaine et al. | 702/176 |
| 7,743,279 | B2 * | 6/2010 | Walker et al. | 714/30 |
| 7,747,901 | B2 * | 6/2010 | Swoboda | 714/30 |
| 2004/0133698 | A1 * | 7/2004 | Swoboda et al. | 709/236 |
| 2008/0235538 | A1 * | 9/2008 | Horley et al. | 714/47 |
| 2009/0183034 | A1 * | 7/2009 | Houlihane et al. | 714/45 |
| 2009/0204951 | A1 * | 8/2009 | Laurenti et al. | 717/128 |
| 2013/0042155 | A1 * | 2/2013 | Millet et al. | 714/45 |
| 2013/0263093 | A1 * | 10/2013 | Brandt et al. | 717/128 |

* cited by examiner

*Primary Examiner* — Scott Baderman
*Assistant Examiner* — Joseph Kudirka
(74) *Attorney, Agent, or Firm* — Eschweiler & Associates, LLC

(57) ABSTRACT

A system includes an integrated circuit having a first component and a first unit. The first component is configured to generate a first trace information. The first unit is implemented in hardware and configured to generate a first time information based on a time of the generation of the first trace information and configured to generate a first data sequence including the first trace information and the first time information.

24 Claims, 10 Drawing Sheets

SYSTEM AND METHOD FOR PROCESSING TRACE INFORMATION

FIELD

The invention relates to electronic systems. In particular, the invention relates to systems and methods for processing trace information.

BACKGROUND

Trace information may be required for the development, conformance, interoperability and field testing of electronic systems. Systems and methods for processing trace information constantly have to be improved. In particular, it may be desirable to improve the quality and efficiency of such systems and methods.

BRIEF DESCRIPTION OF THE DRAWINGS

Aspects of the disclosure are made more evident by way of example in the following detailed description of embodiments when read in conjunction with the attached drawing figures, wherein.

DETAILED DESCRIPTION

Figure 1:
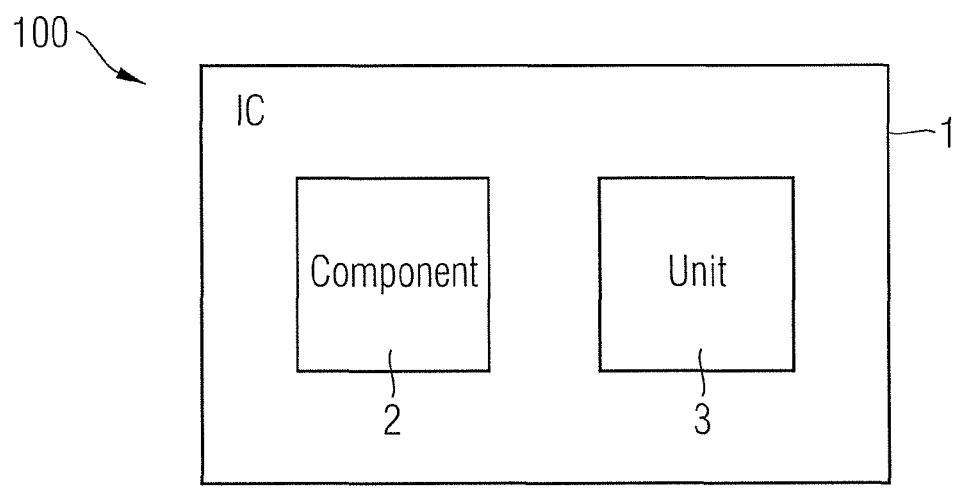
FIG. 1 is a schematic block diagram of a system 100 in accordance with the disclosure.

In the following detailed description, reference is made to the accompanying drawings, which form a part thereof, and in which is shown by way of illustration embodiments in which the invention may be practiced. It is understood that other embodiments may be utilized and structural or logical changes may be made without departing from the scope of the present disclosure. The following detailed description, therefore, is not to be taken in a limiting sense, and the scope of the present invention is defined by the appended claims.

It is understood that the features of the various exemplary embodiments described herein may be combined with each other, unless specifically noted otherwise. Further, like reference numerals designate corresponding similar parts.

As employed in this specification, the terms "coupled" and/or "connected" are not meant to mean in general that the elements must be directly coupled or connected together. Intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

FIG. 1 illustrates an exemplary block diagram of a system 100 in accordance with the disclosure. The system 100 includes an integrated circuit 1 having a component 2 and a unit 3. The component 2 is configured to generate a trace information. The unit 3 is implemented in hardware in one embodiment and configured to generate a time information depending on a time of the generation of the trace information. In addition, the unit 3 is configured to generate a data sequence including the trace information and the time information. More detailed exemplary block diagrams of similar systems are provided below.

Figure 2:
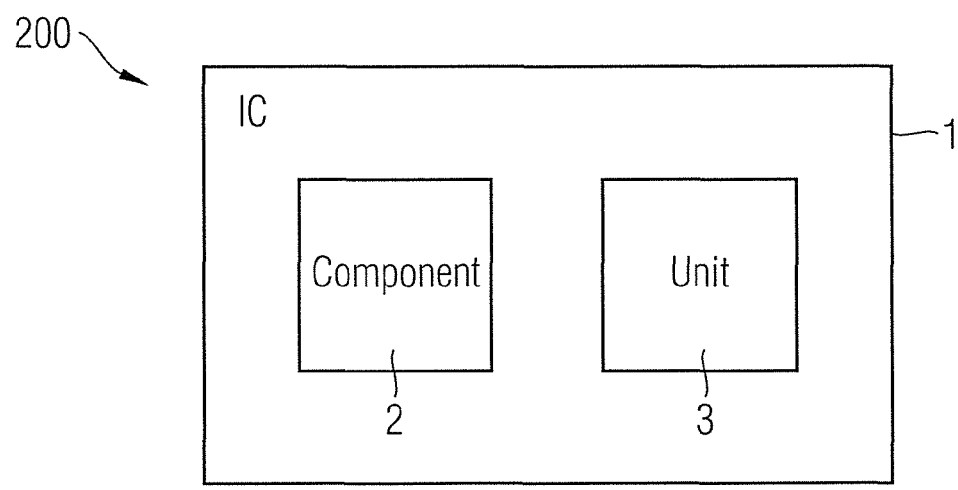
FIG. 2 is a schematic block diagram of a system 200 in accordance with the disclosure.

FIG. 2 illustrates an exemplary block diagram of a system 200 in accordance with the disclosure. The system 200 includes an integrated circuit 1 having a component 2 and a unit 3. The component 2 is configured to generate a trace information. The unit 3 is implemented in hardware in one embodiment and configured to generate a formatted data sequence based on a data format of a protocol, the formatted data sequence including the trace information. More detailed exemplary block diagrams of similar systems are provided below.

Figure 3:
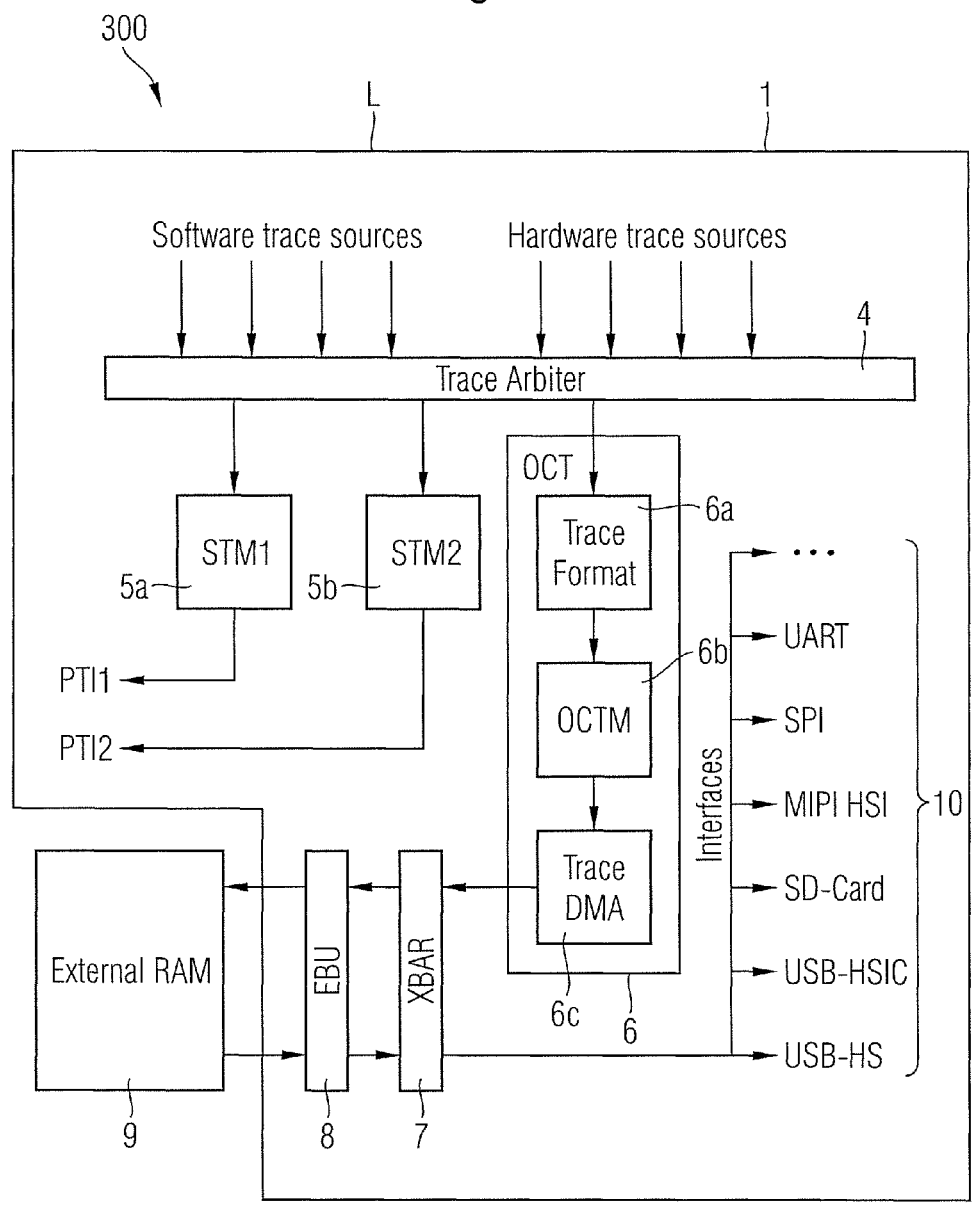
FIG. 3 is a schematic block diagram of a system 300 in accordance with the disclosure.

FIG. 3 illustrates an exemplary block diagram of a system 300 in accordance with the disclosure. The system 300 includes an integrated circuit 1 wherein the boundaries of the circuit are indicated by a line L such that all components arranged within the line L form a part of the integrated circuit 1 in one embodiment. It is understood that the term "integrated circuit" may be similar to and may be replaced by one of the terms "integrated circuit chip", "chip", "microchip", etc. The integrated circuit 1 is of arbitrary type, for example a baseband integrated circuit, a radio frequency integrated circuit, an automotive chip, a sensor chip, a microprocessor, etc. The integrated circuit 1 may be manufactured by an arbitrary technology and may, for example, be designed as and/or may include logic integrated circuits, analog integrated circuits, mixed signal integrated circuits, memory circuits, integrated passives, etc.

The integrated circuit 1 may include one or more software components (not illustrated). Each of the software components may operate as a trace source (or master), i.e. may be configured to generate a trace information (see arrows "Software trace sources"). In a similar fashion, the integrated circuit 1 may further include one or more hardware components (not illustrated) wherein each of the hardware components may be configured to generate a trace information (see arrows "Hardware trace sources"). A trace information generated by one of the software or hardware components may include information on a state of the respective component, for example information on a clock frequency, a current, a voltage, a temperature, etc. In addition, the trace information may include information on a process executed by the respective component.

The integrated circuit 1 may include an arbiter 4 (or trace arbiter or trace backbone) having one or more inputs and outputs. The inputs of the arbiter 4 may be coupled to the software and hardware components and may be configured to receive the trace information of these components. A first output and a second output of the arbiter 4 may be coupled to a first trace module 5a and a second trace module 5b, respectively. In addition, a third output of the arbiter 4 may be coupled to a trace unit 6. Each of the trace modules 5a and 5b may be coupled to an interface, for example a PTI (Parallel Trace Interface), providing a connection to an external component, in particular a trace tool. The trace unit 6 may include a formatting unit 6a, a buffer memory 6b and a Direct Memory Access (DMA) unit 6c.

The trace unit 6 may be coupled to a bus system 7 which may be connected to a memory controller 8. The integrated circuit 1 may be coupled to an external memory 9, for example a ring buffer, via an output of the memory controller 8. It is understood that the memory 9 may alternatively be arranged on the integrated circuit 1. An output of the memory 9 may be coupled to the integrated circuit 1 via an input of the memory controller 8. An output of the memory controller 8 may be coupled to an input of the bus system 7 while an output of the bus system 7 may be coupled to one or more output ports (or interfaces) 10. For example, the interfaces 10 may correspond to, or may include, legacy ports. In FIG. 3, various exemplary interfaces are indicated, namely UART (Universal Asynchronous Receiver Transmitter), SPI (Serial Peripheral Interface), MIPI (Mobile Industry Processor Interface) HSI (High Speed Synchronous Interface), an interface to a SD (Secure Digital) Card, USB (Universal Serial Bus) HSIC (High Speed Inter-Chip), USB HS (High Speed), etc.

During an operation of the system 300, the arbiter 4 receives trace information from active software and/or active hardware components. For each received trace information of a component, the arbiter 4 may generate a time information depending on a time of the generation of the trace information. In addition, the arbiter 4 may be configured to generate a data sequence including the received trace information and the time information. For example, the time information may indicate the time when the data sequence is generated. The time information may be based on a system time of the integrated circuit 1 or may correspond to a clock count of a clock, the clock count starting when the integrated circuit 1 (and thus the arbiter 4) is powered on. Of course, it may be possible to determine the system time by knowing the clock count.

Figure 4:
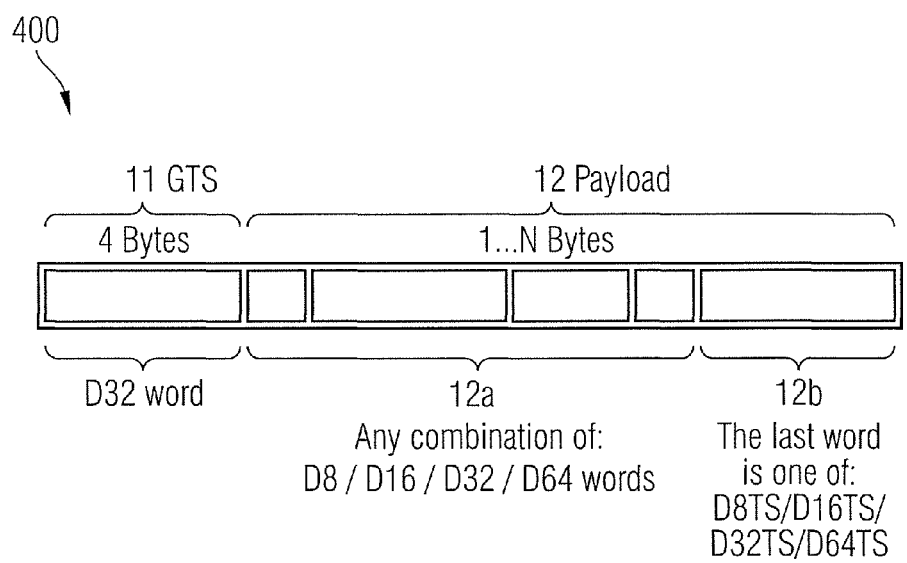
FIG. 4 illustrates a message format 400.

FIG. 4 illustrates an exemplary message format 400 which may correspond to a data sequence generated by the arbiter 4. In the following, the message format 400 may also be referred to as "System Trace Message". The System Trace Message 400 may include a data field 11 which may have a size of 4 bytes, i.e. may correspond to a D32 data word. The data field 11 may include the time information and may be followed by a data field 12 including a trace source specific message payload, i.e. the trace information. The data field 12 may e.g. be formed by an arbitrary combination of D8, D16, D32 and D64 data words and may be divided in two parts 12a and 12b. The first part 12a may correspond to or may include the trace information while the second part 12b may correspond to or may include a time stamp, for example a time stamp in accordance with a MIPI standard. The time stamp may be one of a 8 bit, 16 bit, 32 bit, 64 bit data word (which may be denoted as D8TS, D16TS, D32TS, D64TS) and may be used to indicate the end of the System Trace Message 400.

Referring back to FIG. 3, the arbiter 4 may receive trace information from one or more components and may generate data sequences, i.e. System Trace Messages, in accordance with FIG. 4. In particular, the arbiter 4 may generate a multiplexed data stream including one or more System Trace Messages, the multiplexed stream being output to the first trace module 5a and/or the second trace module 5b and/or the trace unit 6. Each of the trace modules 5a and 5b may convert the received data sequences based on a system trace protocol, for example a MIPI STP (System Trace Protocol), and may forward the formatted data to an interface (see PTI1, PTI2). The formatting unit 6a may receive the System Trace Message and may generate formatted data sequences based on a data format of a protocol (or communications protocol). The protocol may be a byte-oriented message-based container protocol supporting two layers which may be referred to as a "transport layer" and a "data link layer". The protocol may provide the opportunity to multiplex and interleave trace data from different sources into a single data stream.

Figure 5:
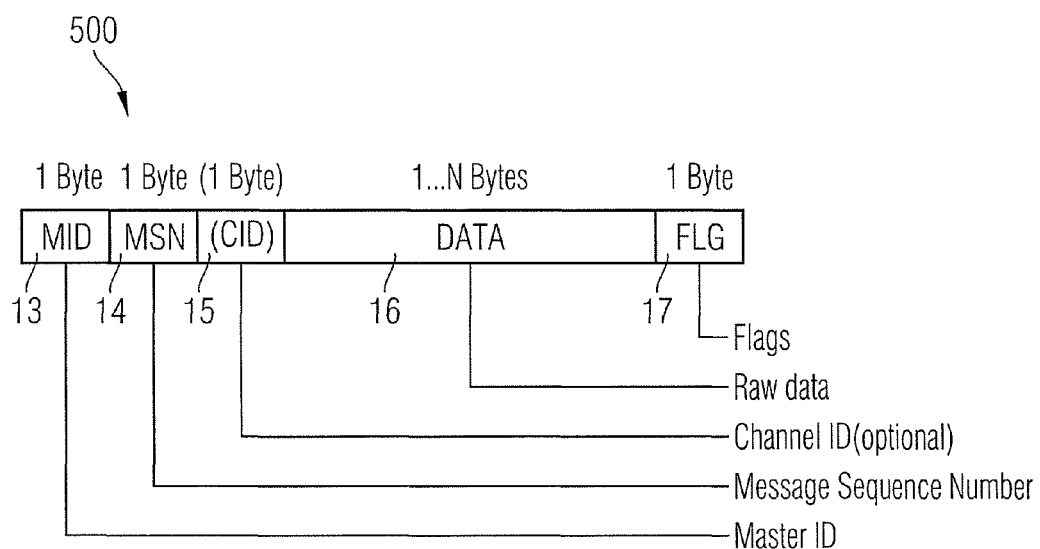
FIG. 5 illustrates a message format 500.

The "transport layer" of the protocol may be based on an exemplary message format 500 shown in FIG. 5 which may be referred to as "System Trace Protocol" (STP) Message. The STP message 500 may have variable size and may encapsulate one or more System Trace Messages. It is understood that the STP message 500 is not restricted to include complete System Trace Messages, but may also include one or more fragments of such messages. The STP message 500 may include data fields 13 to 17 as shown in FIG. 5. It is understood that the STP Message may be modified, for example by discarding one or more of the data fields 13 to 17 and/or by adding additional data fields.

The data field 13 (see MID) may have a size of 1 byte and may be referred to as "Master ID". It may be configured to identify the source of a trace information, i.e. the identity of a master. Trace sources may be either software running on a core (e.g. protocol stack, 3G firmware, DSP firmware) or hardware (e.g. Processor Trace, DigRF, Rake receiver, signal monitoring, etc.). Note that the data field 13 may particularly be generated by the arbiter 4, but may also be generated by the formatting unit 6a.

The data field 14 (see MSN) may have a size of 1 byte and may be referred to as "Message Sequence Number". It may be a message counter modulo 256 which may be managed for every master separately (i.e. independently from a used channel) and may be incremented for every new STP message having the same MID. The data field 14 may be used to detect a lost trace message on an STP level and may particularly be generated by the formatting unit 6a.

The data field 15 (see CID) may have a size of 1 byte and may be referred to as "Channel ID". It may be only used by software trace sources and may identify the task that originated a trace information. For hardware traces the data field 15 is thus not used. The presence of the data field 15 depends on the data field 13 (MID), i.e. only trace sources supporting Channel Interleaving include the CID field. Note that the data field 15 may particularly be generated by the arbiter 4, but may also be generated by the formatting unit 6a.

The data field 16 (see DATA) may have arbitrary size and may include concatenated raw data of System Trace Messages. Here, 16-/32-/64-bit data words may be stored in little endian, i.e. with the least significant byte first. The length of the data field 16 may be variable and not explicitly indicated, since it is implicitly given by the total length of the STP message 500.

The data field 17 (see FLG) may have a size of 1 byte and may include various flags. In particular, the data field 17 may be generated by the formatting unit 6a. For example, a bit at position 7 of the data field 17 may be referred to as "First Fragment Indicator" with a bit value of "0" identifying the content of the STP message 500 as a subsequent fragment of a higher layer System Trace Message. A bit value of "1" may mark the content of the STP message 500 as the start of a higher layer System Trace Message such that this first fragment may be used as a synchronization point.

A bit at position 6 of the data field 17 may be referred to as "Last Fragment Indicator" with a bit value of "0" indicating that a System Trace Message is not yet complete and other fragments will follow. A bit value of "1" may mark the end of a higher layer System Trace Message, i.e. it may indicate that the message is complete and may e.g. be decoded. Hence, a flexible message fragmentation may be possible, since trace information provided by a component (or master) may be interrupted at any position. In addition, a possible fragmentation may avoid message buffering on the integrated circuit 1.

A bit at position 5 of the data field 17 may be referred to as "Overflow Message Indicator" with a bit value of "0" indicating whether the STP message 500 contains data of a higher layer System Trace Message. A bit value of "1" may indicate that the STP Message 500 includes an Internal Overflow Message which may only be supported by hardware masters. Thus, a signaling of internal data overflows may be provided, for example for the case of the generated data rate being higher than provided by a physical trace interface.

A bit at position 4 of the data field 17 may be referred to as "Master Type" with a bit value of "0" indicating that the STP Message 500 originates from a software type master, i.e. the optional CID field is present and Internal Overflow Messages are not supported. A bit value of "1" may indicate that the STP Message 500 originates from a hardware type Master, i.e. the optional CID field is missing and Internal Overflow Messages are supported.

Bits at position 3, 2, 1 and 0 of the data field 17 may be reserved for future use and thus particularly have a bit value of "0".

Figure 6:
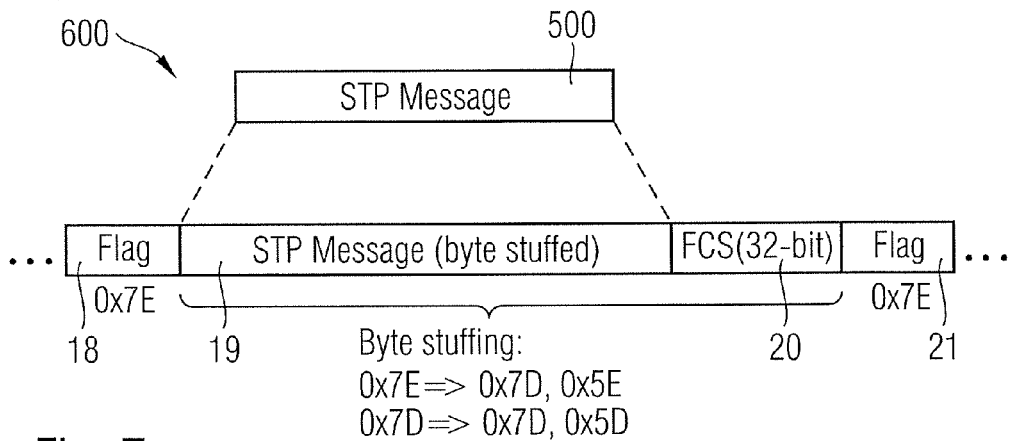
FIG. 6 illustrates a message format 600.

The "data link layer" of the protocol may be based on an exemplary message format 600 shown in FIG. 6 which may be referred to as "frame". The message format 600 may be used for encapsulating an STP message 500 and may include data fields 18 to 21 as indicated in FIG. 6. It is understood that the message format 600 may be modified, for example by discarding one or more of the data fields 18 to 21 and/or by adding additional data fields.

The data field 18 (see Flag) may correspond to an opening flag having a size of e.g. 8 bits and may be configured to indicate the start of the frame 600. Said 8 bits may correspond to a predetermined bit sequence, for example [01111110], i.e. 0x7E in a hexadecimal notation.

The data field 19 (see STP Message (byte stuffed)) may be of arbitrary size and may include an STP message as well as additional stuffed bits or stuffed bytes in order to adapt the size of the frame 600 to a required size or bit rate. In particular, the protocol overhead on the data link layer may thus depend on the actual content of the frame 600, but may correspond to at least 5 bytes per frame.

The data field 20 (see FCS (32-bit)) may be referred to as "Frame Check Sequence" and may have a size of e.g. 32 bits. The FCS may include an error checking number to provide integrity protection, i.e. to provide the possibility of tracing transmission errors. A component receiving the frame 600 may use the FCS to verify whether or not the received data packet is error free or not. This way, errors in the transmission of trace data may be detected inside and outside the integrated circuit 1.

The data field 21 (see Flag) may correspond to a closing flag having a size of e.g. 8 bits and may be configured to indicate the end of the frame 600. The 8 bits may correspond to a predetermined bit sequence, for example [01111110], i.e. 0x7E in a hexadecimal notation.

Referring back to FIG. 3, the formatting unit 6a may format data received from the arbiter 4 in accordance with the described protocol and may output the formatted data to the memory buffer 6b. The formatted data may be transmitted via the buffer memory 6b, the DMA unit 6c, the bus system 7 and the memory controller 8 to the memory 9. Note that a storage of the trace data in the memory 9 may particularly have become possible thanks to formatting the trace information according to the described protocol. The formatted data may be read from the memory 9 and may be transmitted via the memory controller 8 and the bus system 7 to one or more of the output ports 10.

External components (not illustrated) coupled to the interfaces 10 may access the formatted trace data and verify the checksums (see data field 20 in FIG. 6). Formatted trace data that has been corrupted due to transmission errors may be discarded. By knowing the information provided by the protocol, an external component may reassemble received formatted data sequences or fragments thereof. In addition, missing fragments may be detected on the basis of data field 14 (see FIG. 5). Due to the time information that has been provided by the arbiter 4 for each trace information coming from an active component, a global view on the active components of the integrated circuit 1 and their operations may be possible for a given time or a given time interval.

Figure 7:
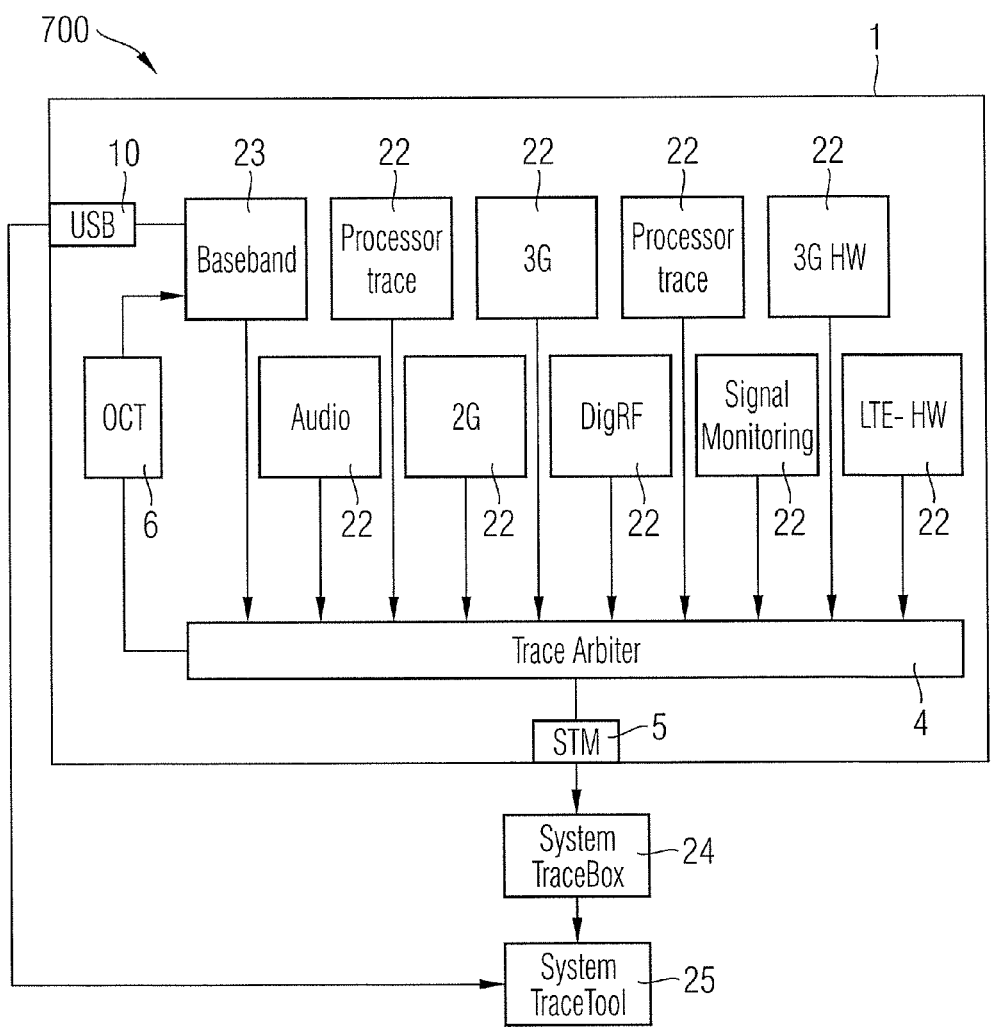
FIG. 7 is a schematic block diagram of a system 700 in accordance with the disclosure.

FIG. 7 illustrates an exemplary block diagram of a system 700 in accordance with the disclosure. The system 700 is similar to the system 300 of FIG. 3. Comments made in connection with FIG. 3 may thus also hold true for FIG. 7.

The system 700 includes an integrated circuit 1 having multiple hardware and/or software components 22 that may provide trace information. For example, the components 22 may be one of a DigRF interface, a signal monitoring software or hardware, a baseband host processor, a Power Management Unit (PMU) etc. Trace data provided by the components 22 may be processed by an arbiter 4 and a trace unit 6. In addition, the trace data may be transmitted to a trace module 5 which may be identified with one or both of the trace modules 5a and 5b of FIG. 3. Data output by the trace module 5 may be forwarded to an external trace tool 25 via an external buffer memory 24.

The formatted data output by the trace unit 6 may be transmitted to one or more components of the integrated circuit 1 such that the data may be directly evaluated on the integrated circuit 1. For example, the data may be transmitted to a processor 23, e.g. a baseband processor, which may process and/or analyze the formatted data and/or forward the formatted data an output port 10. Note that the data output at the interface 10 may also be accessed by the trace tool 25.

Figure 8:
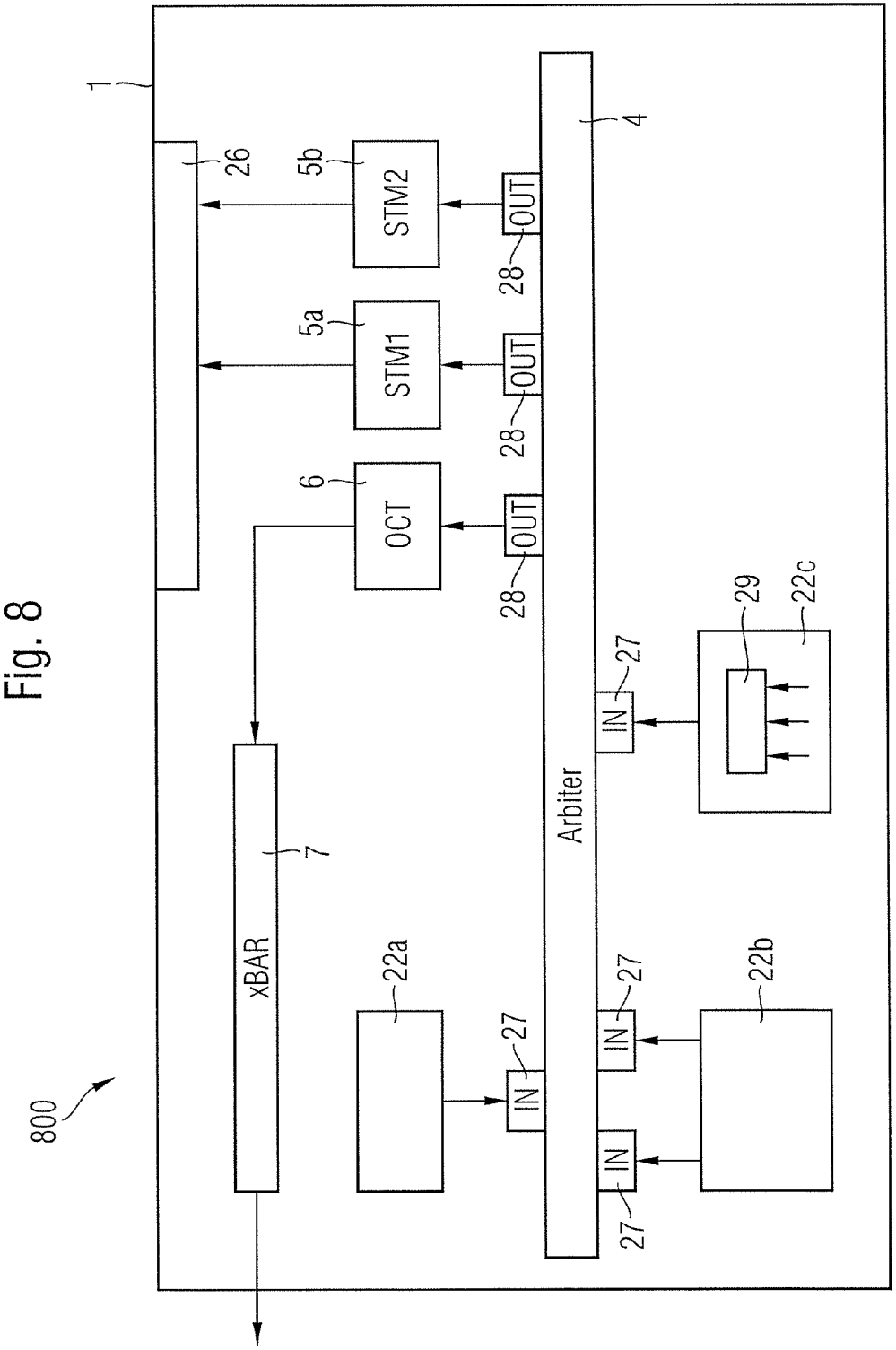
FIG. 8 is a schematic block diagram of a system 800 in accordance with the disclosure.

FIG. 8 illustrates an exemplary block diagram of a system 800 in accordance with the disclosure. The system 800 is similar to systems described above such that previous comments may also hold true for components of the system 800.

The system 800 includes an integrated circuit chip 1 having components 22a, 22b, 22c configured to generate trace information. Each of the components 22a, 22b, 22c may be coupled to one or more input ports 27 of an arbiter 4 wherein each input port 27 may include a buffer (or FIFO) memory (not illustrated). For example, component 22a may provide trace information to only one input port 27 while component 22b may provide trace information to two input ports 27. The component 22c may include an arbiter 29 configured to receive trace information from more than one components (not illustrated) of the component 22c. The arbiter 29 may be configured to process and multiplex received trace information into a single data stream which may be forwarded to an input port 27 of the arbiter 4.

The trace information received at the input ports 27 may be processed by the arbiter 4 in a manner already described above. The arbiter 4 may include one or more, e.g. three, output ports 28 which may be coupled to a first trace module 5a, a second trace module 5b and a trace unit 6, respectively. An operation of the trace modules 5a, 5b and the trace unit 6 has already been described in connection with FIG. 3. The trace unit 6 may be coupled to a bus system 7 providing an opportunity for an external component (not illustrated) to access the formatted trace data. Each of the trace modules 5a, 5b may be coupled to an interface 26 which may provide data processed by the trace modules 5a, 5b to an external component (not illustrated), for example to an external trace tool.

Figure 9:
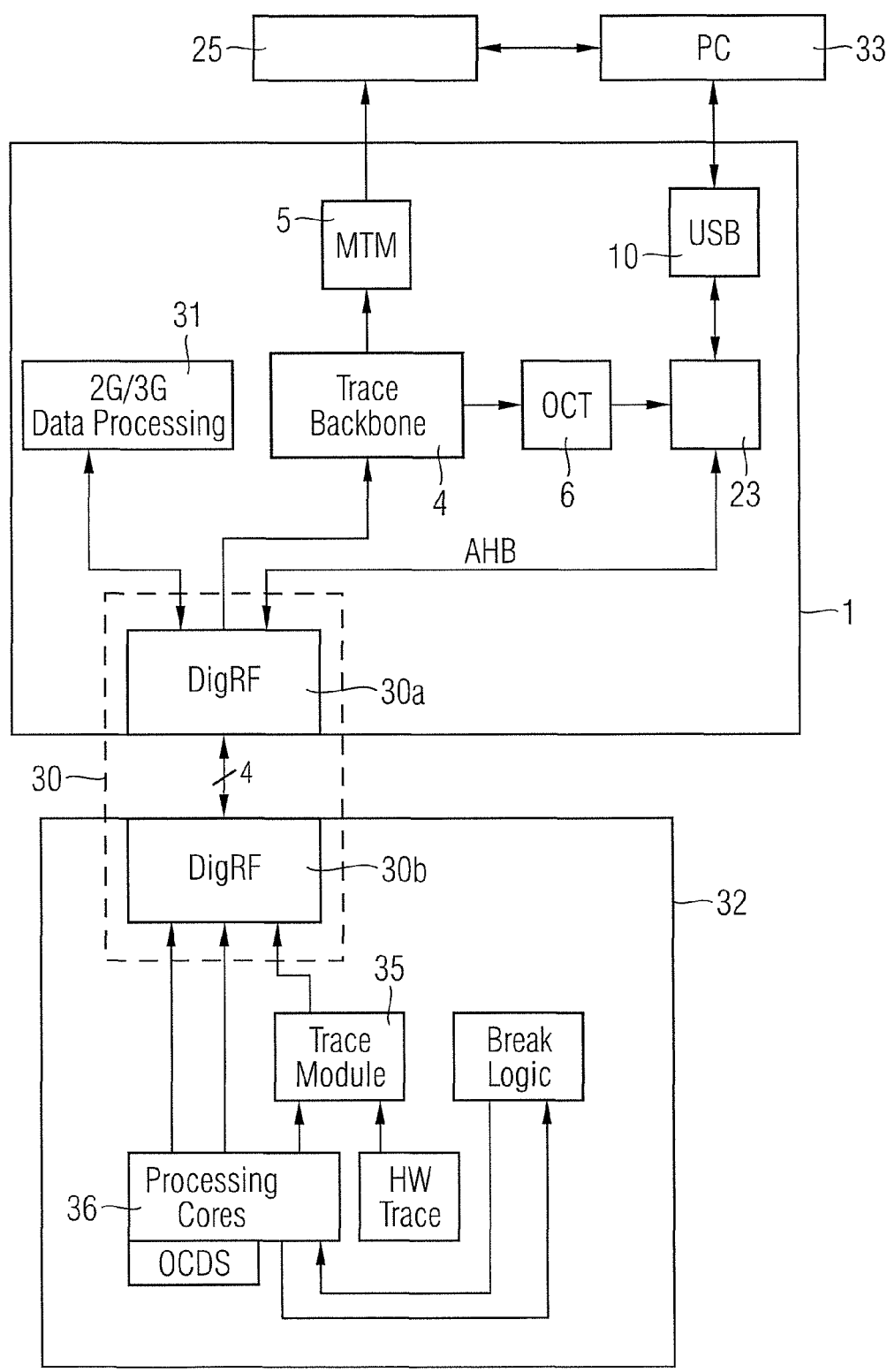
FIG. 9 is a schematic block diagram of a system 900 in accordance with the disclosure.

FIG. 9 illustrates an exemplary block diagram of a system 900 in accordance with the disclosure. The system 900 includes an integrated circuit 1 and may be coupled to a radio frequency unit 32 via a DigRF interface 30. Hence, the integrated circuit 1 may particularly correspond to or may include a baseband chip. The integrated circuit 1 may include various components 4, 5, 6, 10 and 23 that have already been described above. A trace module 5 may be coupled to an external trace tool 25 while an output port 10 may be coupled to a personal computer 33. In addition, the trace tool 25 may be coupled to the personal computer 33 such that trace data may be exchanged between these components. The integrated circuit 1 may include a DigRF interface 30a configured to receive trace information from the radio frequency unit 32 and forward such information to an arbiter 4. Note that a more detailed illustration of an interface between the arbiter 4 and the DigRF interface 30 is illustrated in FIG. 10.

The DigRF interface 30 may be configured to exchange data between the radio frequency unit 32 and a component 31 of the integrated circuit 1 which may e.g. be configured to perform a 2G/3G data processing. For example, the exchanged data may include payload data (i.e. TX data, RX data) and/or control data and/or data for a time control (timing) of components of the integrated circuit 1 and the radio frequency unit 32. Note that a processing of DigRF data by the component 31 is decoupled from a processing of trace data by the arbiter 4. That is, an operation of the component 31 is not affected by an operation of the arbiter 4.

The radio frequency unit 32 may include a DigRF interface 30b which is coupled to its counterpart 30a of the integrated circuit 1. The DigRF interface 30b is coupled to components of the radio frequency unit 32, namely to processing cores 36 providing data for e.g. a 2G/3G data processing (see component 31) and to a trace module 35 providing trace information. The trace data may include information on processes executed by components of the radio frequency unit 32 and/or states of theses components.

Figure 10:
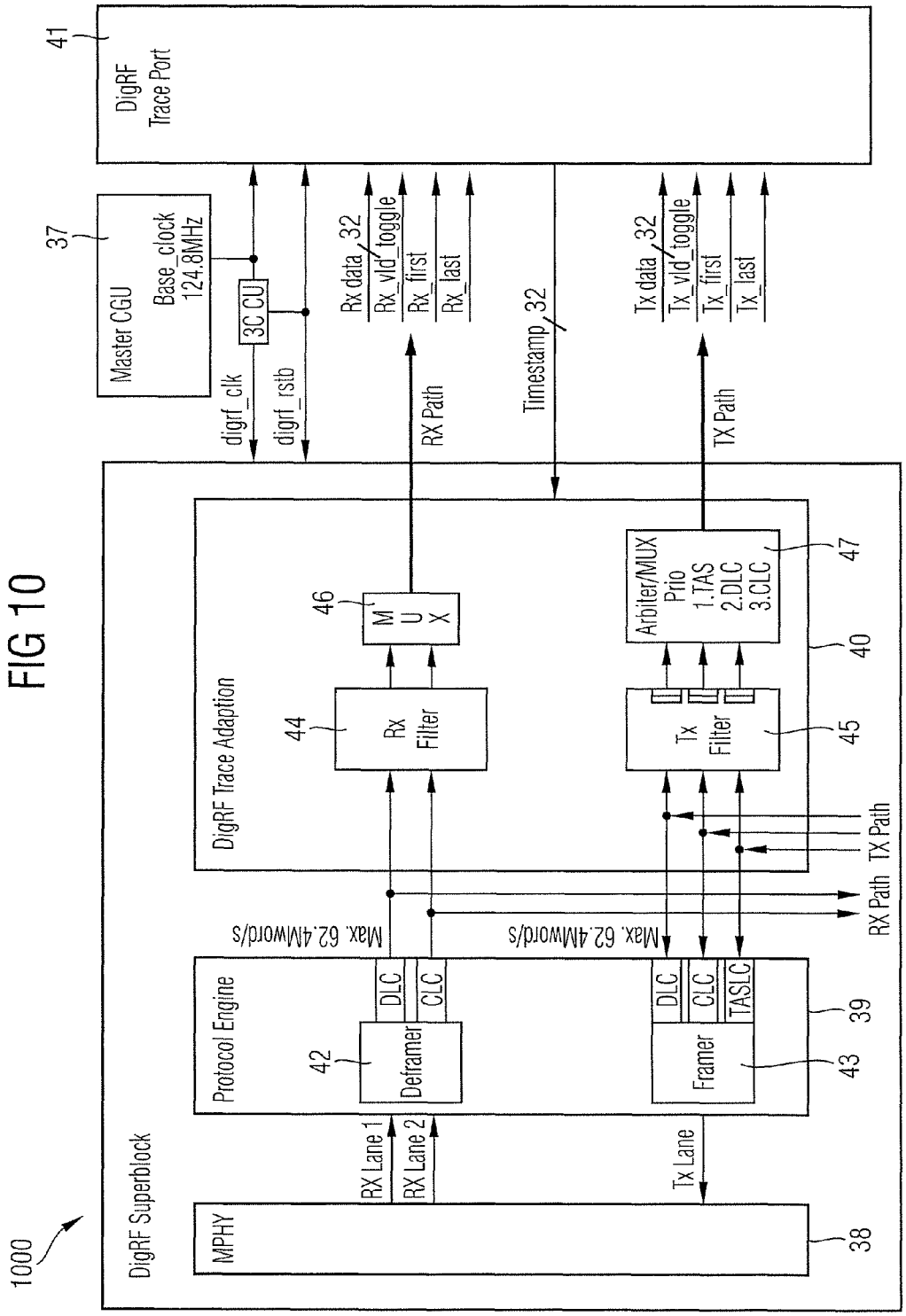
FIG. 10 is a schematic block diagram of an interface 1000.

FIG. 10 illustrates an exemplary block diagram of an interface 1000 as it may be arranged between the DigRF interface 30 and the arbiter 4 of FIG. 9. The interface 1000 may include a clock generator unit (CGU) 37 configured to provide a clock of e.g. 124.8 MHz to clock components of the interface 1000. The interface may further include an interface 38 which may be based on an MPHY standard and a protocol engine 39. The interface 38 and the protocol engine 39 may form a part of a DigRF interface that it to be traced. It is understood that the DigRF interface may include further components which are not illustrated for the sake of simplicity. The interface 1000 may further include a unit 40 configured to process data provided by the protocol engine 39 as well as a trace port 41.

During an operation of the interface 1000, data may be transmitted between a baseband unit (see e.g. integrated circuit 1 of FIG. 9) and a radio frequency unit (see e.g. unit 32 of FIG. 9) via a DigRF interface. RX data received from the radio frequency unit (see RxLane1, RxLane2) may be processed by the protocol engine 39 (see deframer 42) and sent to the baseband unit (see vertical arrows labeled "RX Path"). In a similar fashion, TX data received from the baseband unit (see vertical arrows labeled "TX Path") may be processed by the protocol engine (see framer 43) and sent to the radio frequency unit (see TxLane). Referring back to FIG. 9, the described transmission of RX data and TX data may correspond to a data exchange between the 2G/3G data processing component 31 and the processing cores 36.

The unit 40 may include a first filter 44 configured to extract trace information from the RX data. In addition, a multiplexer 46 may be arranged downstream of the first filter 44 to multiplex data streams output by the first filter 44 in order generate a single multiplexed data stream which may be forwarded to the trace port 41. The multiplexed data may be converted from a DigRF data format to a data format supported by the arbiter 4. When a transfer of RX data from the multiplexer 46 to the trace port data 41 is started, the start of a message may be signalized by enabling a signal line Rx_first. Thus, the Rx_first indicator may be used for sampling a time stamp, i.e. for generating a time information depending on the time of the generation of the respective RX data. Each valid data sample may be signalized by a toggle on a signal line Rx_vld_toggle. Each time this signal is toggled, data may be sampled on the same edge of a clock digRF_clk (see clock generator unit 37). The end of an RX message may be indicated by an active Rx_Last signal. The converted data stream may be stored in a dedicated buffer memory, e.g. a FIFO memory, and may be forwarded by the arbiter 4 to its output ports.

The unit 40 may include a second filter 45 configured to extract trace information from the TX data. In addition, a unit 47 may be arranged downstream of the second filter 45. The unit 47 may include an arbiter configured to order data frames of DLC type, CLC type and TAS messages according to their priority as well as a multiplexer configured to multiplex data streams to a single data stream. The multiplexed data may be converted from a DigRF data format to a data format supported by the arbiter 4. When a transfer of TX data from the unit 47 to the trace port data 41 is started, the start of a message may be signalized by enabling a signal line Tx_first. Thus, the Tx_first indicator may be used for sampling a time stamp, i.e. for generating a time information depending on the time of the generation of the respective TX data. Each valid data sample may be signalized by a toggle on a signal line Tx_vld_toggle. Each time this signal is toggled, data has to be sampled on the same edge of a clock digRF_clk (see clock generator unit 37). The end of a TX message may be indicated by an active Tx_Last signal. The converted data stream may be stored in a dedicated buffer memory, e.g. a FIFO memory, and may be forwarded by the arbiter 4 to its output ports.

Figure 11:
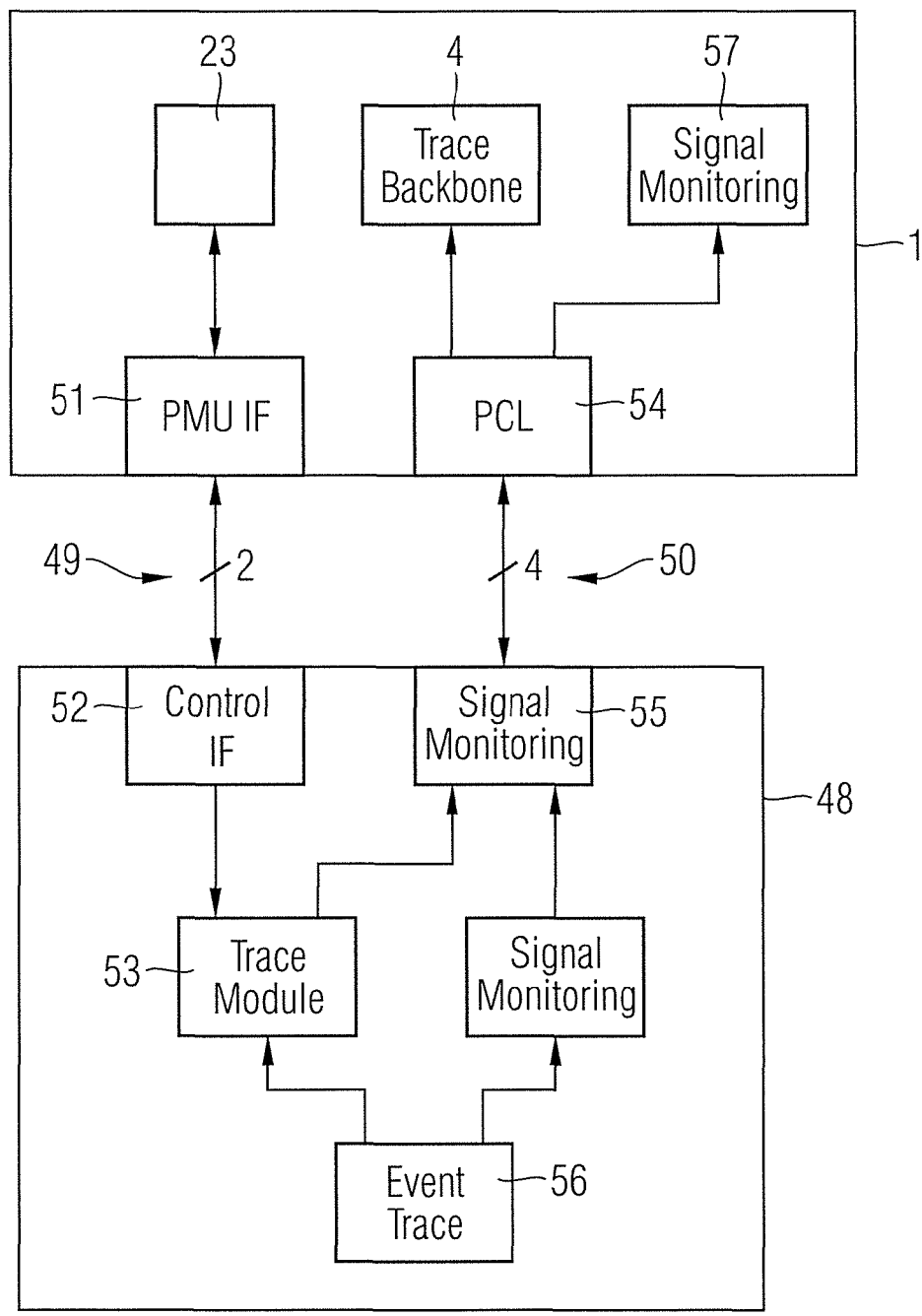
FIG. 11 is a schematic block diagram of a system 1100 in accordance with the disclosure.

FIG. 11 illustrates an exemplary block diagram of a system 1100 in accordance with the disclosure. The system 1100 may include an integrated circuit 1 and a power management unit (PMU) 48 which may be coupled via two data connections 49 and 50. The first data connection 49 may couple an interface 51 arranged on the integrated circuit 1 with an interface 52 arranged on the PMU 48 such that it may be possible for a processor 23 to control one or more components of the PMU 48. The second data connection 50 may couple an interface 54 arranged on the integrated circuit 1 with an interface 55 arranged on the PMU 48 such that may be possible to exchange trace information between these components. Note that each of the interfaces 54 and 55 may correspond to or may include a dedicated pin arranged on the boundaries of the integrated circuit 1 and the PMU 48, respectively.

During an operation of the system 1100, an event on the PMU 48 may be traced (see "Event Trace" 56), for example a power event such as a Pulse Width Modulation (PWM) switch, a Pulse Frequency Modulation (PFM) switch, an enable or a disable of one or more domains or a signal monitoring. A trace information depending on the event may be transmitted to the interface 55. The PMU 48 may generate a serial data stream including the trace information which may be formatted to a trace format required by the arbiter 4. The data stream may be stored in a FIFO memory (not illustrated) which may be arranged between the interface 54 and the arbiter 4. The data stream including the trace information may be transmitted to the arbiter 4 and processed according to operational steps that have been described in connection with previous figures. Note that the data stream including the trace information may also be transmitted to a signal monitoring unit 57.

Figure 12:
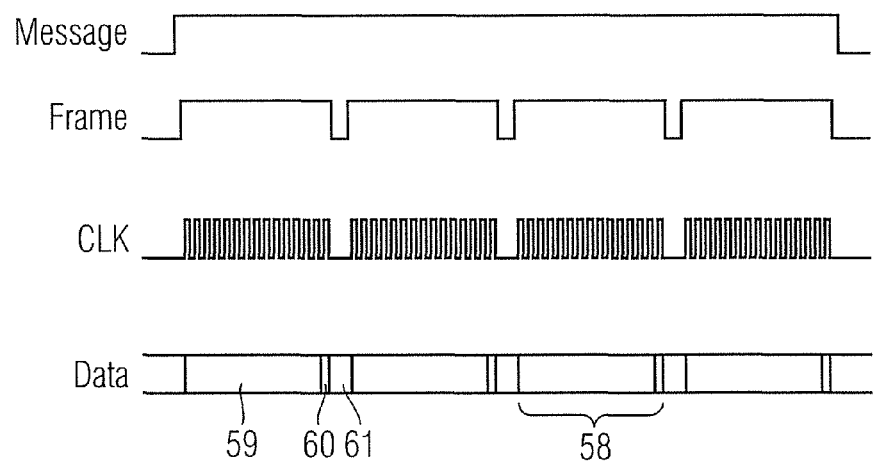
FIGS. 12a and 12b illustrate message formats.

FIG. 12a illustrates a message format as it may be transmitted in a serial manner between the PMU 48 and the arbiter 4. The start and the end of the message format (see "Message") is indicated by a rising edge and a falling edge, respectively. The message may include multiple frames (see "Frame") which may have a length of a predetermined number of clock counts (see "CLK"). The resulting data stream (see "Data") may include one or more data sequences 58, each of which may include a payload part 59 having a length of e.g. 32 bit and a parity bit 60 which may be generated in the PMU 48 during the generation of the data sequence. For example, the parity bit 60 may have a value of "1" on an even amount of high data bits. Note that two subsequent data sequences 58 may be separated by an interval 61.

FIG. 12b illustrates a message format as it may be generated by the arbiter 4. The message format may include a time information (see ST_Arbiter_Timestamp) having a size of e.g. 32 bits which may be arranged at the start of the message. The time information may be followed by an arbitrary number of N data words, each of with may have a size of e.g. 32 bits. The data words may include trace information (see "Payload").

Referring back to FIG. 11, trace information that is to be formatted according to the data format of FIG. 12b may be transmitted from the PMU 48 to the arbiter 4. Since the data format of FIG. 12b is configured to include a number of N 32 bit data words, it may be possible for the arbiter 4 to process and generate a trace information having a size of N times 32 bits. This trace information may be analyzed by a component coupled to the arbiter 4. In a similar manner, trace information having a size of 4 bits (see data connection 50) may be transmitted to the monitoring unit 57. Note that, since the number N of data words is not restricted by an upper limit, it may be possible for the arbiter 4 to generate a trace information (having a size of N times 32 bits) which may be more complicated compared to a trace information (having a size of 4 bits) transmitted to the monitoring unit 57.

Figure 13:
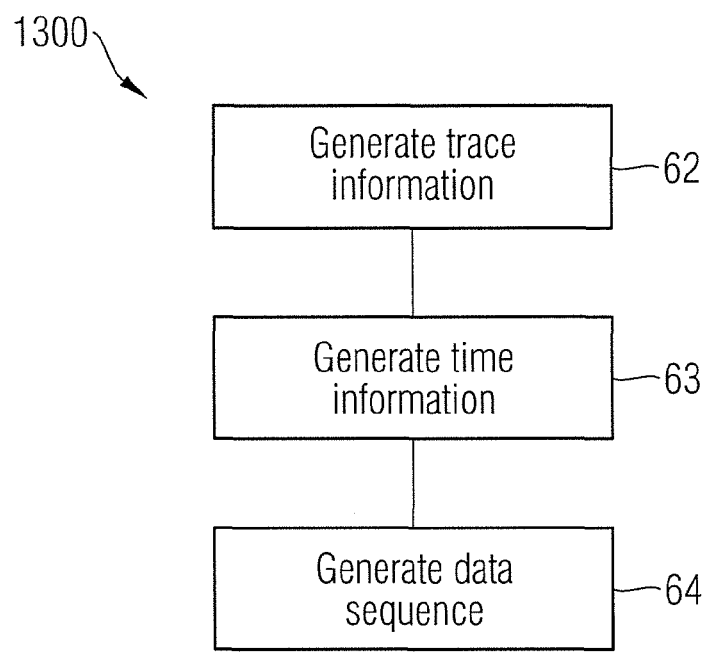
FIG. 13 is a schematic block diagram of a method 1300 in accordance with the disclosure.

FIG. 13 illustrates an exemplary block diagram of a method 1300 in accordance with the disclosure. The block diagram may be read in connection with the system 100 FIG. 1, but is not so limited. For example, the block diagram may be also read in connection with each of the systems shown in FIGS. 3, 7 and 8. In a method step 62, a trace information is generated by a component of an integrated circuit (see component 2 of FIG. 1). In a method step 63, a time information is generated by a unit of the integrated circuit (see unit 3 of FIG. 1), wherein the time information depends on a time of the generation of the trace information. The unit of the integrated circuit is implemented in hardware. In a method step 64, a data sequence is generated by the unit (see unit 3 of FIG. 1), wherein the data sequence includes the trace information and the time information.

Figure 14:
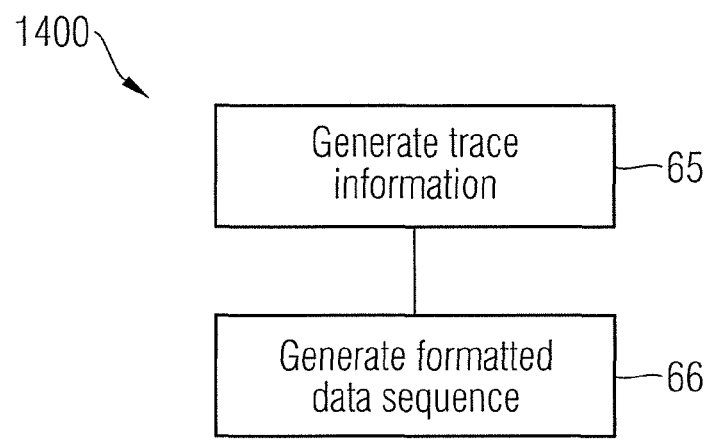
FIG. 14 is a schematic block diagram of a method 1400 in accordance with the disclosure.

FIG. 14 illustrates an exemplary block diagram of a method 1400 in accordance with the disclosure. The block diagram may be read in connection with the system 200 of FIG. 2, but is not so limited. For example, the block diagram may also be read in connection with each of the systems shown in FIGS. 3, 7 and 8. In a method step 65, a trace information is generated by a component of an integrated circuit (see component 2 of FIG. 2). In a method step 66, a formatted data sequence is generated on the basis of a data format of a protocol. The formatted data sequence includes the trace information and is generated by a unit of the integrated circuit (see unit 3 of FIG. 2) wherein the unit is implemented in hardware.

It is understood that each of the methods 1300 and 1400 may be modified by adding further method steps. In particular, additional method steps may correspond to or may include any of the operational steps performed by components described above.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A system including an integrated circuit, comprising:
a first component configured to generate a first trace information, the first component being a power management unit and the first trace information comprising an information about a power event, wherein the power event comprises a Pulse Width Modulation (PWM) switch, a Pulse Frequency Modulation (PFM) switch, or an enabling or disabling of one or more domains; and
a first unit implemented in hardware and configured to generate a first time information based on a time of the generation of the first trace information and configured to generate a first data sequence comprising the first trace information and the first time information.

2. The system of claim 1, wherein the first trace information further comprises a signal monitoring.

3. The system of claim 1, wherein the first trace information comprises information on at least one of:
a state of the first component; and
a process executed by the first component.

4. The system of claim 1, wherein the first unit is configured to generate a first formatted data sequence based on a data format of a protocol, wherein the first formatted data sequence comprises at least a part of the first data sequence.

5. The system of claim 4, wherein the first formatted data sequence comprises a fragmentation information configured to indicate whether or not the first formatted data sequence completely comprises the first data sequence.

6. The system of claim 4, wherein the first formatted data sequence comprises a source information configured to identify the first component as a source of the first trace information.

7. The system of claim 4, wherein the first formatted data sequence comprises a task information configured to identify a task performed by a software component as a source of the first trace information.

8. The system of claim 4, wherein the first formatted data sequence comprises:
one or more further data sequences, each of the further data sequences comprising a trace information and a time information, respectively; and
an information configured to identify a number of the data sequences in the first formatted data sequence.

9. The system of claim 4, wherein the first formatted data sequence comprises a checksum.

10. The system of claim 4, wherein the first formatted data sequence comprises at least 32 bits.

11. The system of claim 1, wherein the integrated circuit comprises a baseband chip.

12. The system of claim 1, wherein the first component comprises a software component and the first trace information is generated by the software component.

13. The system of claim 1, wherein the first component comprises a hardware component and the first trace information is generated by the hardware component.

14. The system of claim 1, further comprising:
a second component configured to generate a second trace information, wherein the first unit is configured to generate a second time information based on a time of the generation of the second trace information and configured to generate a second data sequence comprising the second trace information and the second time information.

15. The system of claim 14, wherein the first unit comprises a first subunit implemented in hardware and configured to:
receive the first trace information from the first component at a first input;
receive the second trace information from the second component at a second input; and
output a multiplexed data stream comprising the first data sequence and the second data sequence.

16. The system of claim 15, wherein the first unit comprises a second subunit implemented in hardware, wherein the second subunit is arranged downstream of the first subunit and configured to generate a formatted data sequence based on the multiplexed data stream and based on a data format of a protocol.

17. The system of claim 15, wherein the first subunit comprises a buffer memory coupled to the first input of the first subunit.

18. The system of claim 4, further comprising:
a memory configured to store the first formatted data sequence.

19. The system of claim 4, further comprising:
a processor coupled to the first unit and configured to process the first formatted data sequence.

20. The system of claim 4, further comprising:
an output port configured to provide the first formatted data sequence to an external component.

21. The system of claim 1, further comprising:
an output port configured to provide the first data sequence to an external trace unit.

22. A system including an integrated circuit, comprising:
a component configured to generate a trace information, the component being a power management unit and the trace information comprising an information about a power event, wherein the power event comprises a Pulse Width Modulation (PWM) switch, a Pulse Frequency Modulation (PFM) switch, or an enabling or disabling of one or more domains; and
a unit implemented in hardware and configured to generate a formatted data sequence based on a data format of a protocol, the formatted data sequence comprising the trace information.

23. A method, comprising:
generating a trace information by a component of an integrated circuit, the component being a power management unit and the trace information comprising an information about a power event, wherein the power event comprises a Pulse Width Modulation (PWM) switch, a Pulse Frequency Modulation (PFM) switch, or an enabling or disabling of one or more domains;
generating a time information by a unit of the integrated circuit, the unit being implemented in hardware and the time information based on a time of the generation of the trace information; and
generating a data sequence by the unit, the data sequence comprising the trace information and the time information.

24. A method, comprising:
generating a trace information by a component of an integrated circuit, the component being a power management unit and the trace information comprising an information about a power event, wherein the power event comprises a Pulse Width Modulation (PWM) switch, a Pulse Frequency Modulation (PFM) switch, or an enabling or disabling of one or more domains; and
generating a formatted data sequence based on a data format of a protocol, wherein the formatted data sequence comprises the trace information and is generated by a unit of the integrated circuit, the unit being implemented in hardware.

* * * * *